United States Patent Office
3,501,241
Patented Mar. 17, 1970

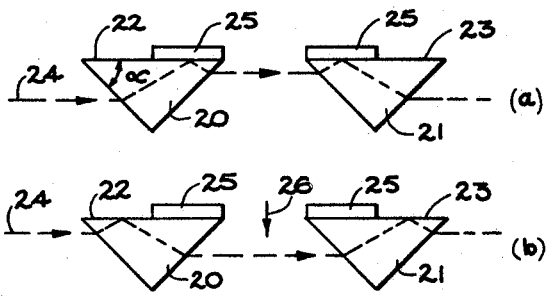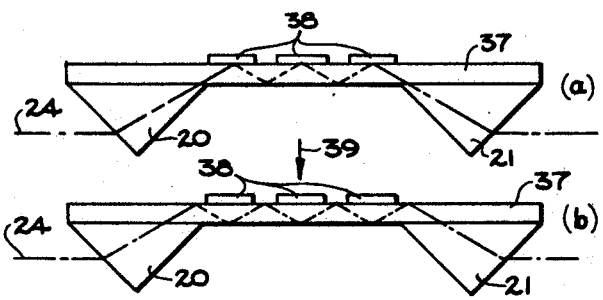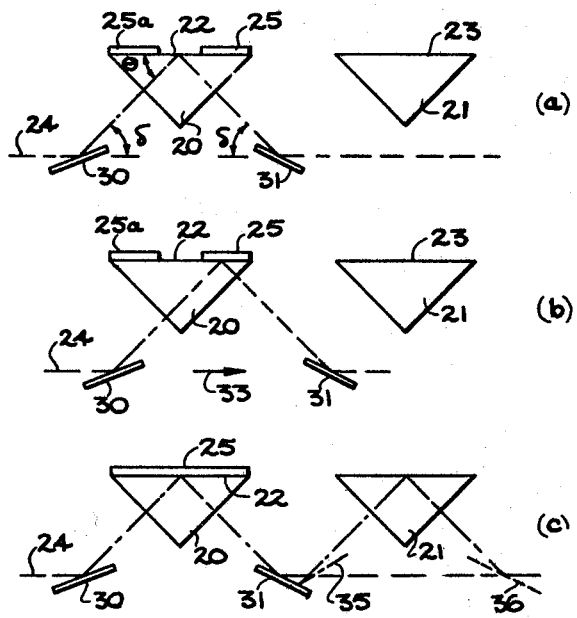

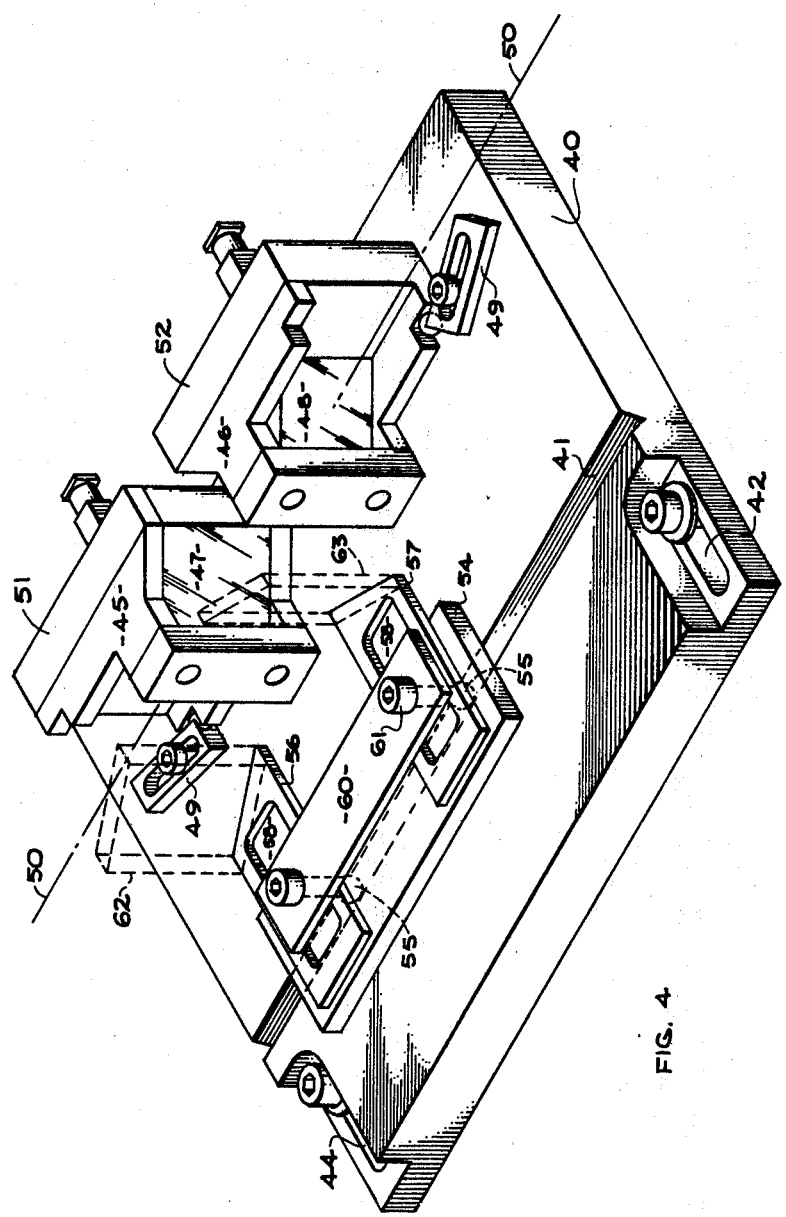

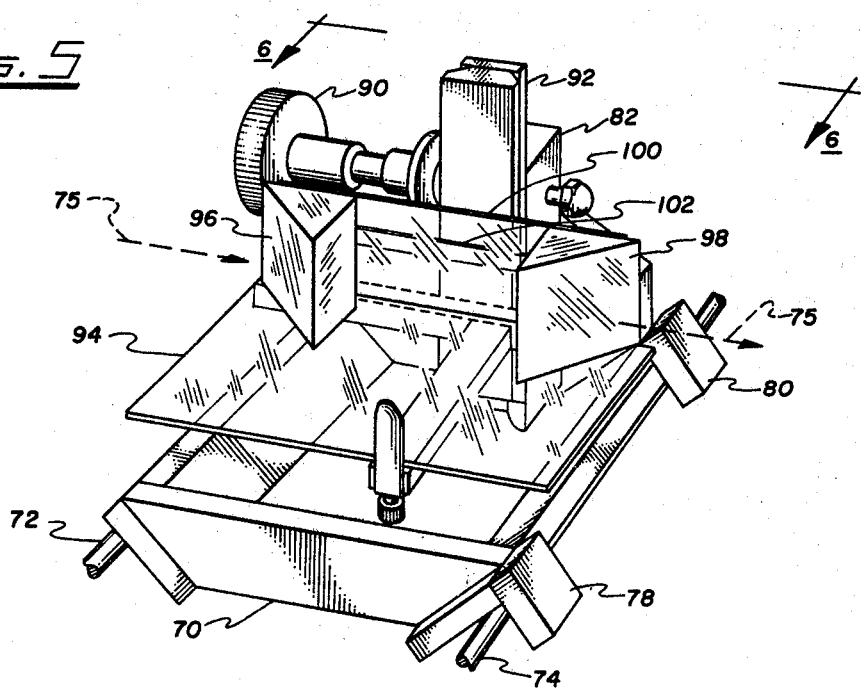
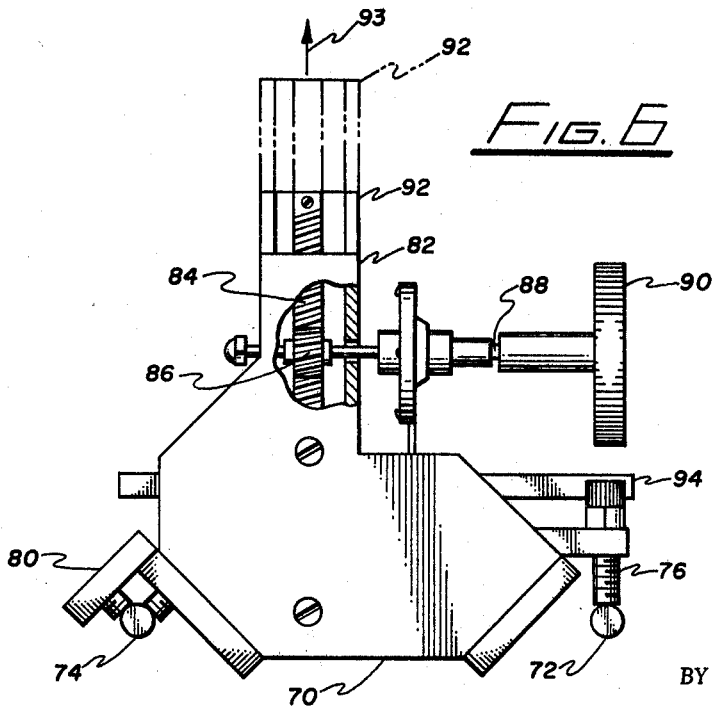

3,501,241
SINGLE AND MULTIPLE INTERNAL REFLECTION CELLS
Wilford N. Hansen, Richmond, Utah, and James A. Horton, Thousand Oaks, Calif., assignors to North American Rockwell Corporation
Continuation-in-part of application Ser. No. 397,195, Sept. 17, 1964. This application Dec. 12, 1968, Ser. No. 783,232
Int. Cl. G01n 21/16
U.S. Cl. 356—244                                7 Claims

ABSTRACT OF THE DISCLOSURE

Spectrometer cells for single and multiple internal reflection studies are disclosed where each cell utilizes a pair of prism members to direct a light beam to a sample contacting surface or a reflecting surface. The unit is arranged such that the prism members are movable with respect to the light beam so that the sample contacting and reflecting surfaces may be selectively scanned to obtain a background reflection spectrum as well as the absorbance spectrum of the sample.

CROSS-REFERENCE TO RELATED APPLICATION

This application is a continuation-in-part of application S.N. 397,195, filed Sept. 17, 1964, now abandoned, and assigned to the same assignee as the present invention.

BACKGROUND OF THE INVENTION

In the use of reflection devices in a spectrometer, it is necessary to know the net response of the instrument to a standard sample and compare thereto the response of the instrument to the sample under investigation in order to determine the reflectivity of the sample. Further, the response of the instrument continuously changes as a function of time and periodic comparisons to a standard sample are necessary. In prior art devices it has been necessary to remove the sample or to provide elaborate supplementary optics in order to make such periodic comparisons with a standard sample. The present invention is directed to overcoming this disadvantage by providing a device which eliminates beam shift due to prism dispersion, provides excellent angle accuracy and reproducibility of positioning, and allows the sample surface to be scanned without changing the beam geometry or path length.

OBJECTS OF THE INVENTION

Therefore, it is the primary object of the present invention to provide an improved reflection device which utilizes a minimum of optical units and which may be placed directly in the sample compartment of a standard spectrometer.

Another object of the present invention is to provide an improved reflection unit in which a sample surface may be scanned without disturbing the beam geometry and beam shift due to improper positioning may be minimized.

A further object of the present invention is to provide a reflection unit in which a reflecting sample face may be scanned at other than dove angles without shifting the beam axis.

A still further object of the present invention is to provide a simple reflection cell in which a reference surface and/or sample surface may be scanned while maintaining the same beam path length.

These and other objects of the present invention will become more apparent from the following detailed description of various embodiments of the present invention taken together with the drawings, hereby made a part thereof.

DESCRIPTION OF THE DRAWINGS

FIG. 1 is a schematic diagram of one embodiment of the present invention;
FIG. 2 is a schematic diagram of a second embodiment of the present invention;
FIG. 3 is a schematic diagram of a multiple reflection embodiment of the present invention;
FIG. 4 is a perspective view of one embodiment of the present invention;
FIG. 5 is a perspective view of a second embodiment of the present invention; and
FIG. 6 is an elevation of the embodiment as shown by FIG. 5 in the direction of the view arrows 6—6.

DESCRIPTION OF THE INVENTION

Referring to the drawings in detail, FIG. 1(a) shows schematically the arrangement of the preferred embodiment of the present invention utilizing a pair of prisms 20 and 21 which have their sample contacting surfaces 22 and 23, respectively, in coplanar relationship and parallel to a light beam or straight optical axis 24. The two prisms have identical angles and preferably are of the isosceles type. A sample 25 for which a reflection spectrum is desired, is placed in optical contact with a portion of the surfaces 22 and 23 so that the beam 24 is reflected once at each of the interfaces between samples 25 and the sample surfaces 22 and 23. By utilizing a pair of prisms the geometry of the beam 24 is maintained in alignment. As the beam 24 strikes the initial face of prism 20 it is refracted toward the surface 22. The angle of refraction is the same regardless of where the beam strikes the initial face, but the position of beam 24 along this initial face controls the point where the refracted beam is reflected by the surface 22 of the interface of contacting surface 22 with sample 25. The reflected light is again refracted by the second refracting surface of the prism 20 along a path parallel to but usually displaced from the incident beam 24. The second prism 21 functions in the same manner as the first prism 20 except that the beam displacement resulting from the refraction of prism 20 is corrected by prism 21 so that the final beam is axially coincident with the initial beam 24.

FIG. 1(b) shows the arrangement of FIG. 1(a) except that both prisms 20 and 21 have been displaced, as a unit, in a direction, indicated by arrow 26, normal to the path of beam 24 in the same plane as defined by the path of beam 24, i.e., the plane defined by the surface of the drawing. This displacement moves the point of reflection at the coplanar surfaces 22 and 23 away from the interface of sample 25 to a point on those surfaces free of the sample where only the reflective bare surface of prism 20 redirects the light back through the prism to a refracting surface.

In this manner the double dove unit of FIG. 1 allows an examination of a sample of any index of refraction and any absorption coefficient in the UV-Vis-IR regions, while at the same time by a simple movement of the unit a perfect reflection, or any other sample, may be examined. This arrangement results in no change in the light beam path length and no change in the beam geometry.

The prisms utilized are preferably of the isosceles type with the particular use dictating the type, the angle α, the length of sample contacting surfaces 22 and 23, and the prism material.

It is also apparent from FIGS. 1(a) and (b) that by movement of the unit in the direction indicated by arrow 26 the surface of the sample 25 may be scanned by the beam. Thus, variations in the interface between the sample 25 and the surfaces 22 and 23 or interface irregularities may be minimized and improved spectral results obtained.

FIG. 2 shows another embodiment of the present invention in which at least one pair of front surface mirrors 30 and 31 are utilized and in which a sample 25 and a standard sample 25a are positioned in spaced apart relation on the sample surface 22. In this embodiment the mirrors 30 and 31 move as a unit in a direction parallel with the axis of the beam 24 so that the point of reflection on the surface 22 of prism 20 is moved. Thus, the surface 22 may be easily scanned by movement of the mirrors 30 and 31 in the direction of the arrow 33 (FIG. 2(b)). With a pair of samples, 25 and 25a, as shown in FIG. 2, it is apparent that a background reflection measurement, as well as a standard sample comparison, can be obtained by merely sliding mirrors 30 and 31 so that the point of reflection moves along surface 22. Further, such movement does not affect the beam alignment.

This embodiment requires that the angle of deflection α for each mirror is equal and that the second mirror 31 is positioned to return the beam to its original axis. The second prism 21 is not utilized in this embodiment unless a second reflection is desired in which case a second pair of mirrors or a common central mirror would be provided.

Another modification of the embodiment of FIGS. 2(a) and (b) is shown in FIG. 2(c). In this modification the prism 20 has a sample 25 covering its entire surface 22 and a background check for instrument drift is obtained by moving the mirrors 30 and 31 parallel to the optical beam 24 to the positions 35 and 36 shown in dotted lines in FIG. 2(c). Further, the point of scan may be shifted all along the sample 25 as described above.

FIG. 3 shows a multiple reflection embodiment where the two prisms 20 and 21 are optically connected by a light conducting member 37 which has a plurality of spaced apart samples 38 of the substances to be studied in optical contact with one of its surfaces. It is clear that by controlled movement of the entire unit of FIG. 3(a) in a direction normal to the beam axis 24 that the point of reflection with the light conducting member 37 will be shifted. FIG. 3(b) shows the effect of such movement in the direction 39 and illustrates that the effect of this movement is to displace the points of reflection and provide a means for obtaining a background reflection spectrum from the reflecting surfaces of member 37 to provide a quick check on instrument drift. Similar background reflection spectrum may be obtained by removing the sample, however, difficulties in maintaining sample contact as well as leaving films on the surface of member 37 which could effect the background measurement make such a procedure undesirable. However, in this embodiment where prisms 20 and 21 are optically connected, the beam path length will not remain absolutely constant. If absolutely constant path length is desirable the multiple reflection unit of FIG. 3(a) may be substituted for one of the prisms of FIGS. 1 or 2 or a pair of multiple reflection units substituted for the prisms of FIGS. 1 or 2. In such substitutions the number of reflections should be maintained constant by appropriate initial positioning of the prism elements.

FIG. 4 shows one embodiment of the present invention and comprises a base 40 having a longitudinally extending groove 41 oriented parallel to the light beam or optical axis passing through the device, and a pair of slots 42 and 44 normal to the groove 51. A pair of frames 45 and 46, each firmly holding a prism 47 and 48, respectively, are adjustably mounted on the surface of base 40. A plurality of adjustable brackets 49 are utilized to provide accurate alignment of the prisms 47 and 48 with the beam axis 50.

Each of the frames 45 and 46 are provided in this embodiment with liquid sample holders 51 and 52 into which a liquid sample may be inserted in optical contact with the sample contacting surface. Solid samples may also be utilized if desired.

A slidable base 54 having a pair of guides 55 are secured to the bottom of base 54 and are slidable along the longitudinally extending groove 41. A pair of mirror mounts 56 and 57 having center opening 58 to provide longitudinal and lateral freedom for alignment purposes are slidable on base 54. A clamping bar 60 which holds the mirror mounts 56 and 57 in their adjusted position is firmly attached by bolts 61 to base 54. At the end of each mirror mount 57 a front surface mirror 62 and 63 (shown in phantom for clarity) is mounted. When not in use as in the embodiment of FIG. 1, the entire assembly 54 through 63 may be removed.

FIGS. 5 and 6 show another embodiment of the present invention that comprises a base 70 removably positioned on guide rails 72 and 74. The guide rails 72 and 74 are oriented normal to a beam axis 75 that is similar to beam axis 50 as described and as shown by FIG. 4. Base guide 76 (see FIG. 6) cooperates with guide rail 72 and base guides 78 and 80 cooperate with guide rail 74 to maintain the base 70, and thus the device as shown, normal to the beam axis 75 when the base is selectively displaced along the guide rails. It is contemplated that the guide rails can be oriented in directions other than normal to the beam axis 75 so that the base, and thus the device as shown, can be selectively displaced relative to the beam axis.

A housing 82 connected to the base 70 encloses an elevating mechanism that includes a rack 84 and a pinion 86. The pinion 86 is driven by shaft 88 that is connected to a knurled knob 90. The elevating mechanism selectively displaces a movable support member 92 to a desired elevation (such as shown by FIG. 6 in phantom). The displacement of the support member 92 in the embodiment as shown by FIGS. 5 and 6 is in a direction, indicated by arrow 93, perpendicular to the plane defined by the beam axis 75 and the plane of motion of the base 70 along the guide rails 72 and 74. It is contemplated that the support member can also move in directions other than perpendicular as shown by FIGS. 5 and 6; such movement having a vector component that is in a plane coincident with or parallel to a plane defined by a sample contacting surface of a prism (such as sample contacting surface 22 of prism 20 as shown by FIG. 1) or associated light conducting member (such as member 37 as shown by FIG. 3). A support plate 94 is removably retained by the support member 92 and movable therewith.

A pair of prisms 96 and 98 are carried by the support plate 94 and also movable therewith. The two prisms 96 and 98 are optically connected at the prism sample contacting surface by a light conducting member 100 which has a sample 102 of the substance to be studied in optical contact with its sample contacting surface. It is contemplated that member 100 can be other than a light conducting member, i.e., a glass slide as shown having the substance to be studied in optical contact with one of its surfaces. As such, the embodiments as described and shown by FIGS. 1 and 2 could be used with the device as shown by FIGS. 5 and 6.

In the embodiment shown by FIGS. 5 and 6, the base 70, and thus the prisms 96 and 98, are positioned to optimize light through-put by moving the prisms into the beam axis 75. The support plate 94, and thus the prisms 96 and 98, are adjusted to examine the sample 102. Movement of the knurled knob 90 selectively moves the prisms and the sample away from the plane of the beam axis and permits the selective comparison of the sample to a perfect reflection, or to a reference line, or to any other sample.

The single reflection prisms described above may be replaced with other multiple reflection units. The only limitation in the use of such multiple reflecting units for each of the prisms of the above-described embodiments is that the window width of the multiple unit must be greater than the largest beam width, e.g., more than twice the largest beam width.

Although particular embodiments of the present invention have been described, various modifications will be apparent to those skilled in the art without departing from the scope of the invention. Thus, equivalent optical components such as dove prisms may be utilized in place of the isosceles prisms shown, and the angles of the prisms selected in accordance with standard optical techniques. Further, the prisms need not have identical angles or indices of refraction to maintain a constant path length for scanning. Therefore, the present invention is not limited to the specific embodiments disclosed but only by the appended claims.

We claim:

1. A reflection device for scanning a sample surface comprising:
   (a) at least first and second light-directing surfaces disposed in spaced relation on and at opposite equal angles to a straight optical axis,
   (b) a third surface including means for providing optical contact with a sample and being reflective,
   (c) a fourth surface parallel to said third surface and being reflective,
   (d) said third and fourth surfaces being adjacent to each other and laterally disposed parallel to said optical axis and between said first and second light-directing surfaces,
   (e) said first light-directing surface serving to direct light passing along said optical axis away from said straight axis toward one of said third and fourth surfaces,
   (f) said second light-directing surface serving to redirect light reflected from a point on one of said third and fourth surfaces to said straight optical axis so that the light continues along said optical axis, and
   (g) means for moving said first and second surfaces as a unit relative to said straight optical axis so that the point of reflection is selectively moved across said third and fourth surfaces.

2. The device of claim 1 wherein said third and fourth surfaces form a unitary surface and said first and second surfaces are movable as a unit in a direction parallel to said unitary surface.

3. The device of claim 1 wherein said first, second, third and fourth surfaces are movable as a unit in a direction normal to said third and fourth surfaces.

4. The device of claim 1 wherein said first, second, third and fourth surfaces are movable as a unit in a direction parallel to said third and fourth surfaces and perpendicular to said optical axis.

5. The device of claim 1 including a pair of adjacent prisms, one face of each of said prisms being coplanar.

6. The device of claim 1 including a pair of prisms spaced along said optical axis, one face of each of said prisms being coplanar and being said third and fourth surfaces, another face of one prism being said first light-directing surface and the opposite face of the other of said prisms being said second light-directing surface, said prisms being movable as a unit in a direction normal to said optical axis to selectively move said reflection point simultaneously across said third and fourth surfaces for scanning thereof.

7. The device of claim 1 including a pair of prisms spaced along said optical axis, a face of each of said prisms being coplanar, said device further including a light-conducting member optically connecting coplanar faces of said prisms and having a surface parallel to said faces, said last named surface containing said third and fourth surfaces.

No references cited.

RONALD L. WIBERT, Primary Examiner

V. P. McGRAW, Assistant Examiner